Feb. 14, 1950     D. B. BAKER ET AL     2,497,777
PICKER SPINDLE
Filed Jan. 20, 1945     3 Sheets-Sheet 1
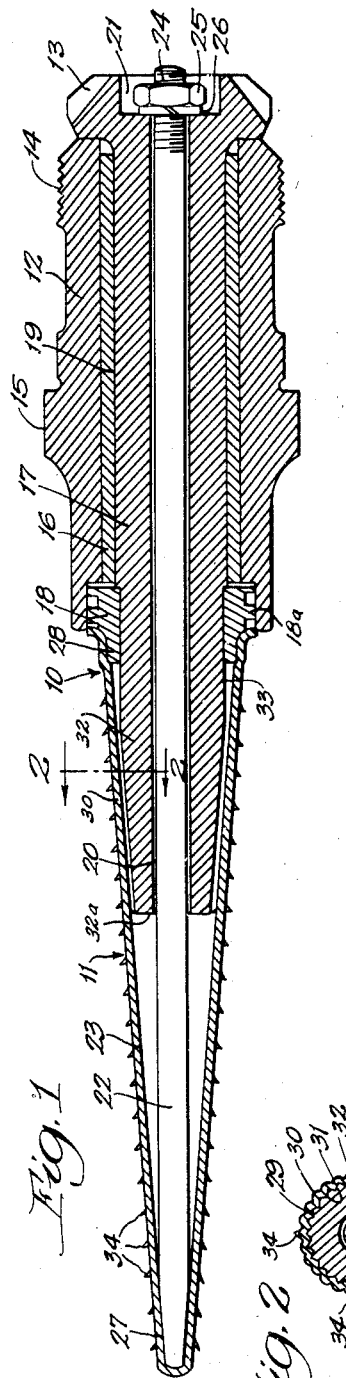
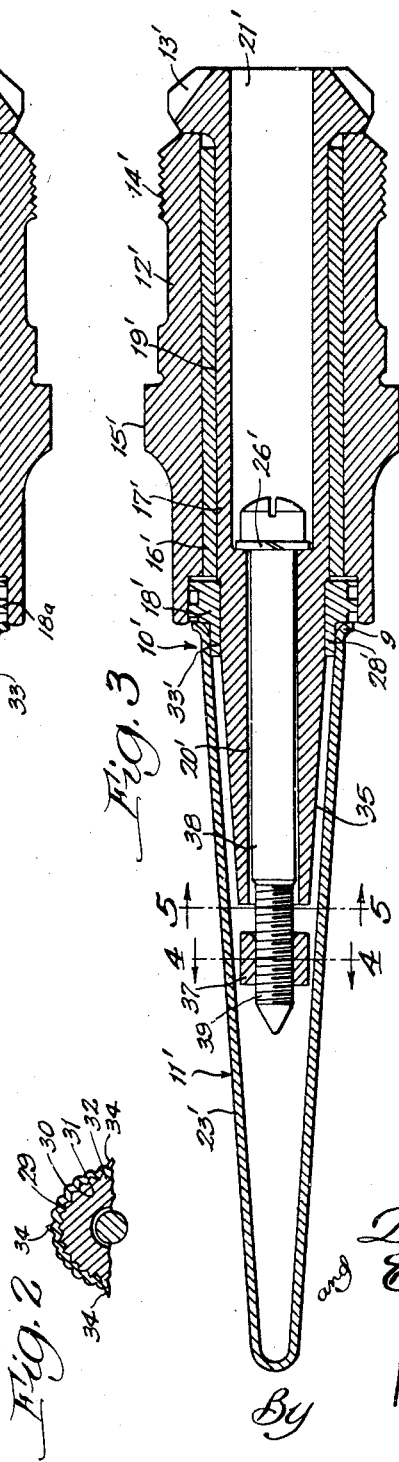
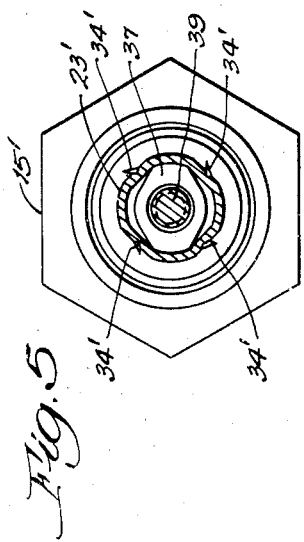
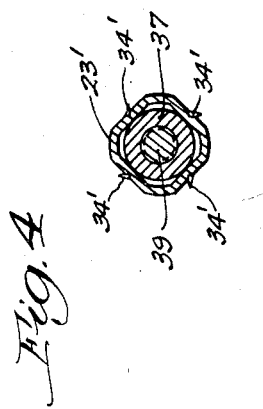
Inventors:
David B. Baker
and Clarence R. Hagen,
By Paul O. Rippel
Attorney.

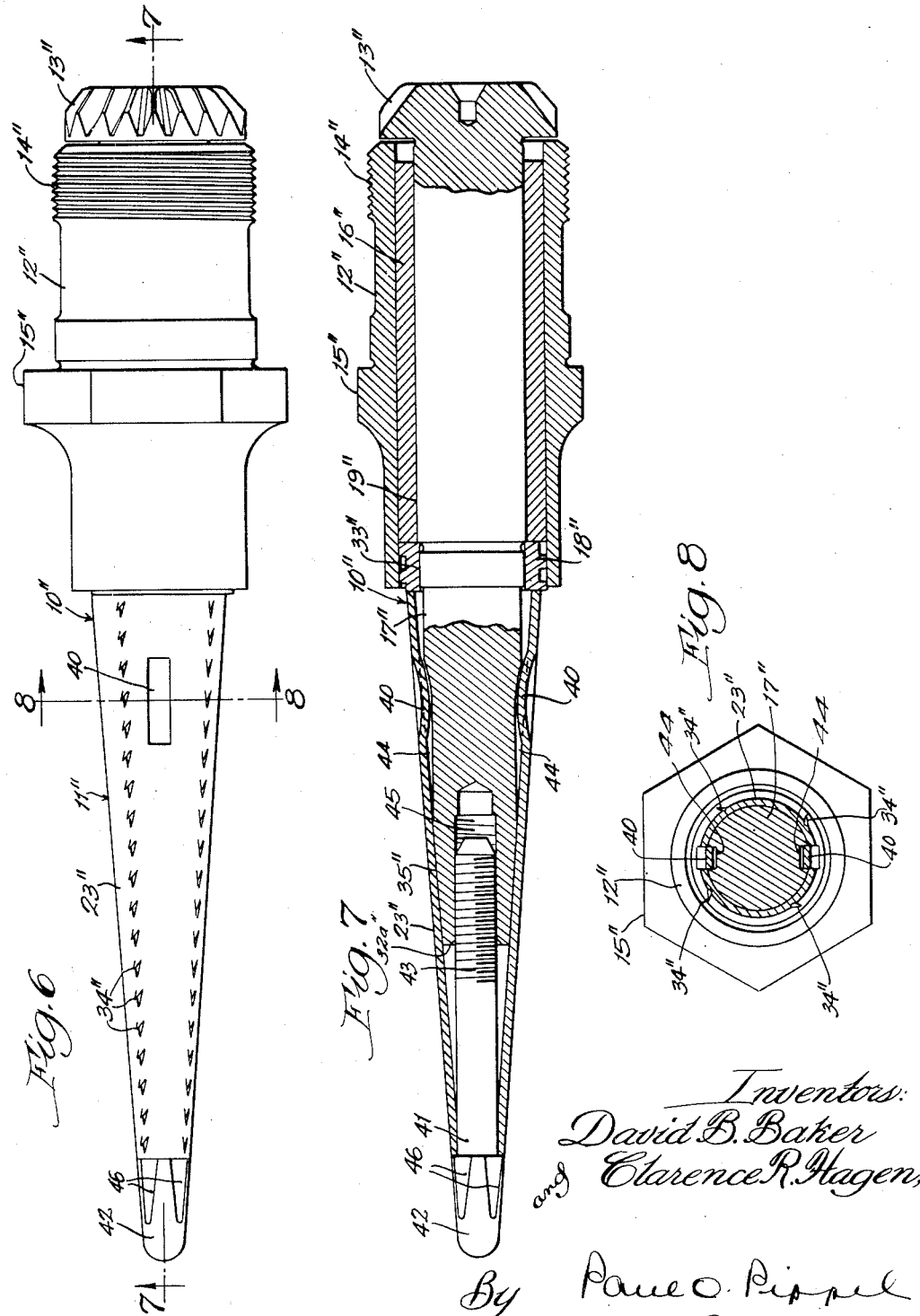

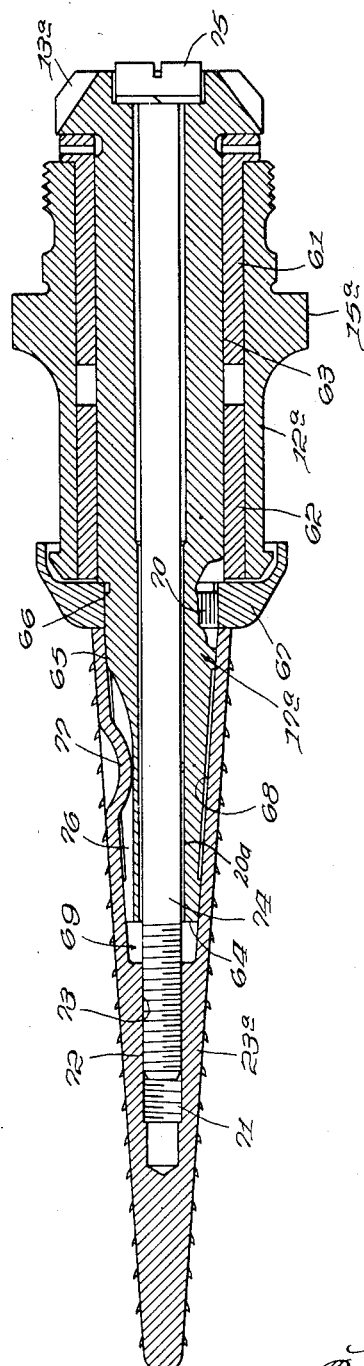

Patented Feb. 14, 1950

2,497,777

UNITED STATES PATENT OFFICE 2,497,777

PICKER SPINDLE

David B. Baker, Riverside, and Clarence R. Hagen, Chicago, Ill.

Application January 20, 1945, Serial No. 573,698

13 Claims. (Cl. 56—50)

This invention is a continuation-in-part of our abandoned patent application Serial No. 559,556, filed October 20, 1944, which is a continuation of our abandoned application Serial No. 476,704 of the same title, filed February 22, 1943, and has to do with spindles suitable for picking fibrous materials, such as cotton lobes from the bolls of plants in the field, and relates more particularly to a novel fabricated spindle from which a part having fiber-catching barbs is conveniently detachable and replaceable.

One of the major problems contended with in cotton picking machines employing sets of rotatable barbed spindles for picking the crop is the dulling of the spindle barbs. As the barbs become dull, they lose their "aggressiveness" in catching onto the crop lint or fibers, wherefore, ultimately the picking efficiency diminishes to a degree requiring spindle replacement. These spindles have been costly to replace from the standpoint that the discarded spindles constitute a sizable quantity of material upon which there are machined surfaces and elements still in splendid condition. The replacement has also been costly from the standpoint of time and labor consumed in the operation. In fact, the task has involved operations tantamount to a general machine overhaul, since each machine has hundreds of spindles on each of which there is a gear or the equivalent to be dismounted from driving relation with a driving part therefor on the machine. When these driving parts are gears, they are lubricated; so are journals in which the spindles are mounted. Heretofore all these lubricated parts have been exposed when changing the spindles, so that this operation has also exceeded a mere field operation from the standpoint of excluding foreign abrasive particles from surfaces they would injure.

An important object of this invention is the provision of a new picker spindle structure embodying a detachably associated barb-carrying portion that is conveniently replaceable.

A further object is the provision of a picker spindle structure as the above in which the attachment and detachment of the barb-carrying portion is accomplishable without removal of the spindles from their bearings or demeshing of their driving gears.

Still a further object is the provision of a picker spindle structure including a spindle projecting exteriorly from a spindle carrier, and barb-carrying sleeve movable endwise over the outer end of the spindle to facilitate installation and removal of the sleeve with respect to the spindle, together with holding means manipulatable exteriorly of the carrier to attach or detach the sleeve to and from the spindle.

Still a further object is the provision of a novel spindle structure wherein a spindle has an exterior bearing portion and an exterior spindle cap receiving portion between the bearing portion and and an end of such spindle, and wherein a barb-bearing cap is detachably retained and mounted on the cap receiving portion.

Still a further object is the provision of a spindle structure according to the next preceding object, but wherein the spindle is hollow and the means for retaining the cap on the cap-receiving portion includes a tension member extending through the spindle from its opposite end.

These and other desirable objects encompassed by and inherent to the invention will be better understood from the ensuing specification and annexed drawings, wherein:

Figure 1 is a longitudinal sectional view taken centrally through a spindle structure consituting one embodiment of the invention;

Figure 2 is a fragmentary transverse sectional view taken upon the line 2—2 of Figure 1;

Figure 3 is a view taken similarly to Figure 1, illustrating a second form of the invention;

Figures 4 and 5 are transverse sectional views taken respectively upon the lines 4—4 and 5—5 of Figure 3;

Figure 6 is a side elevational view of a spindle structure embodying a third form of the invention;

Figure 7 is a longitudinal sectional view taken on the line 7—7 of Figure 6;

Figure 8 is a transverse sectional view taken on the line 8—8 of Figure 6; and

Figure 9 is a sectional view taken similarly to Figure 7 and illustrating a modification related to the embodiment in Figures 6 to 8 but employing a different attaching means for the barbed cap or sleeve.

The spindle unit shown in Figure 1 is but one of many hundred contained in the picking assembly of a cotton picking machine. This unit, which is designated 10, comprises a spindle structure 11 which is journaled in a journal housing 12. The spindle structure 11 of each unit 10 comprises and is rotated by a bevel gear 13 which meshes with a respective gear of several gears within a carrier housing to which the units 10 are secured as illustrated in U. S. Patents Nos. 2,140,631 and 2,440,767. Attachment to the said housing, not shown, is effected by means of a run of screw threads 14 upon the journal member 12. Said housing, not shown, has a plurality of threaded openings into which the thread runs 14 of the journal members 12 are screwable for anchoring the units 10 into place incident to advancing their gears 13 into mesh with respective driving gears therefor within the housing. A faceted section 15 of the journal member 12 is adapted for engagement by a wrench or the like to facilitate rotation of said member in a fashion that it can be screwed tightly into its associated threaded opening within the gear housing of the carrier for the unit 10.

Within the journal member 12 there is a bushing 16 in which a spindle proper 17 is rotatably carried. The gear 13 is formed integrally with the spindle 17. Axial displacement of the spindle 17 within the bushing member 12 is limited in one direction by the gear and in the opposite direction by ring 18 which is pressfitted onto the spindle at the left end of a bearing portion 19 there of which rides within the bushing 16. A helical wiping rib 18a about the outer periphery of said ring wipes the circumscribing periphery of the journal member 12 to exclude foreign material and particles from entering endwise into the bearing.

A channel or axial bore 20, extending coaxially through the spindle 17, has a countersunk section 21 at its right or inner end. This channel is for receiving a slender stem 22 which constitutes means for securing a tapered picker sleeve or cap 23 onto the spindle 17. The right end of the stem 22 is threaded at 24 for receiving a nut 25 and a lock washer 26 which is of sufficient diameter for abutting against the bottom of the countersink 21 when advanced onto the stem by the tightening of the nut. The opposite end of the stem 22 is welded at 27 to the interior of the sleeve 23 so that as the nut 25 is tightened, said stem 22 and the picker sleeve 23 will be advanced axially to the right after the lock washer 26 abuts the bottom of the countersink 21. As the sleeve 23 is thus advanced to the right, the base or larger diameter end thereof will be pressed firmly onto an annular axial extension 28 of the wiping ring 18. Rotation of the sleeve 23 relatively to the spindle 17 is prevented by the inwardly projecting axially extending formations 29 of a fluted portion 30 of the sleeve and which mesh with the grooves 31 within an axially ribbed portion 32 of the spindle; see Figure 2. In Figure 1 it will be noted that the hollow fluted barb-bearing sleeve portion 30 is tapered at the same pitch as the remainder of the sleeve and that the ribbed portion 32 of the spindle has a taper of like pitch (tapering away from the journal portion 17 toward an end 32a of the spindle 17), wherefore the ribs 29 fit within the grooves 31 throughout their entire length.

Both the tapered ribbed portion 32 of the spindle and the cylindrical portion 33 between the tapered portion and the journal portion 19 may be considered as a sleeve-holding portion of the spindle, since each reacts radially upon the sleeve 23 to hold the same in coaxial relation with the spindle. The cylindrical portion 33, of course, reacts through the flange 28 on the wiping ring 18.

Inasmuch as the member 23 is closed at its outer end, it may also be thought of as a cap although it is herein referred to as a sleeve, since it corresponds functionally to a picker sleeve 23" in that form of the invention shown in Figures 6 to 8.

Four rows of picker points or barbs 34 are provided or formed as desired upon the outer periphery of the sleeve 23. A comparison of Figures 1 and 2 will reveal that these rows of barbs 34 extend lengthwise of the sleeve and are equally spaced circumferentially thereof.

After the machine upon which these picker units 10 are installed has been in operation long enough for the barbs 34 to lose their "aggressiveness," it becomes necessary to replace these barbs with others which are in a sharpened condition. Heretofore, changing the barbs has involved removal and discard of the spindle 17 upon which they have been formed. With the embodiment of the invention shown in Figures 1 and 2, however, the changing or replacing operation involves only the unscrewing of the bushing member 12 from the machine and the removal of the units 10 for making the nuts 25 of these units accessible for unscrewing from the ends of the stems 22. When this has been done, said stems 22 and the picker sleeves 23, respectively welded thereto, may be withdrawn endwise from the spindle and replaced by a new assembly of picker sleeve and stem. These new assemblies are secured onto their units 10 in the manner described hereinabove simply by tightening the nuts 25 onto their stems 22 incident to drawing the sleeves 23 into the axially assembled position and to flattening the lock washer 26 to prevent accidental loosening of the assembly. Following this operation, the replaced sleeves are associated with the machine by screwing the threaded portions 14 of the bearing members 12 into their respective openings in the gearing housing, not shown, of the picker carrier structure.

In the second form of the invention illustrated in Figures 3 to 5, those parts which are substantially identical to parts hereinabove described in connection with the first embodiment of the invention are indicated by the same respective reference characters with a prime added. The spindle 17' of this second embodiment has a much deeper countersink 21' for the axial channel 20' than the countersink 21 for the channel 20 in the spindle 17. A tapered portion 35 on the front end of the spindle 17' is disposed in spaced relation with respect to the picker sleeve 23'; and the back end, the end of larger diameter, of this sleeve is held in coaxial relation with the spindle 17' by its engagement with the flange 28' of the wiping ring 18' which in turn rests upon the sleeve-holding portion 33' of the spindle. The sleeve 23' has a polygonal transverse section, and while it has four rows of picker barbs 34' corresponding to the barbs 34 of the first embodiment, these barbs are distributed along the axial medians of the four broadest faces of the polygonal sleeve.

An internally threaded member 37 secured coaxially within the sleeve 23' as by being welded thereto serves both as a means for holding the sleeve against rotation relatively to the spindle and as a means for causing the sleeve to be drawn endwise onto and in assembled relation with the spindle. This drawing of the sleeve onto the spindle is accomplished by cooperation between the internally threaded member 37 and a long machine screw 38 extending outwardly from the countersink 21' through the channel 20' in the spindle and into threaded relation with said member 37. In assembling the picker sleeve with the unit 10', the open-ended root portion 9 of such sleeve is first telescoped over and into coaxial relation with the tapered end portion 35 of the spindle. The extreme open-end portion of the sleeve or cap is slid onto the flange 28' of the wiping ring 18', and thereafter the screw 38 is advanced endwise through the channel 20' to bring the threaded portion 39 of this screw into position for meshing with the threads in the member 37 so that upon rotation of the screw, it will first be advanced into the member 37 until the lock washer 26' is brought to bear upon the bottom of the countersink 21', whereupon continued rotation of the screw will flatten this lock washer into locking position and will concurrently draw the sleeve 23' firmly onto the wiping ring. It can be seen from Figures 3 and 5 that the bolt 38 is so associated with the spindle tapered end portion 35 as to be a fabricated part thereof, and that this bolt constitutes a holding means acting through the member 37 to laterally support the cap 23' coaxially with the spindle. By employing the hollow tapered spindle requiring no auxiliary means extending interiorly entirely to its outer end to provide lateral support, the weight and starting inertia of the spindle assemblies is minimized. This is very significant in machines employing five- or six-hundred spindles since the engine must simultaneously overcome the inertia of the vehicle and spindles when starting the machine in operation.

Installation and removal of the unit 10' onto and from a machine is accomplished in the manner above described with the unit 10. Also with the unit 10', changing of barbs that have been dulled by operation and thus having their "aggressiveness" diminished is accomplished merely by the discard of the sleeve 23' and its replacing by a new sleeve. In this second form of the invention the discarded material consists only of the sleeve 23' and the threaded member 37, this being less material discarded since the threaded member 37 is of less mass than the rod 22 of the first embodiment.

The third form of the invention shown in Figures 6, 7, and 8 will now be described, and this description will be shortened and expedited simply by designating those parts corresponding substantially to parts in the first embodiment by the same respective reference numerals with a double prime added.

In this third form of the invention the picker sleeve 23'' and the attaching means therefor are of such a design that only the sleeve itself is discarded and replaced when the bards lose their "aggressiveness." Moreover, in this third embodiment the attaching means for the picker sleeve is accessible for manipulation at the outer end of the spindle in the removal and replacement of the sleeve, thus making it unnecessary to remove the unit 10'' from the machine as a part of the picker sleeve replacement operation. The tapered portion 35'' of the spindle 17'' has keyway slots 44 directed or extending axially thereof in diametrically opposite peripheral portions thereof and is also provided with a threaded axial bore or recess 45 communicating outwardly through its outer end 32a''. The picker sleeve 23'' is tapered at a pitch corresponding to that of the tapered portion 35''. This sleeve is open at both ends. Four axial rows of picker barbs 34'' are provided upon the outer periphery of the sleeve, and inwardly swaged portions 40 (keys) are slidable into the keyway slots 44 of the spindle where they serve as key members for preventing relative rotation of the spindle and sleeve. A headed attachment member 41 is used for detachably holding the sleeve 23' upon the spindle. This member 41 has a head 42 abuttable against the outer end of the sleeve when a threaded shank 43 of said member is turned into the threaded recess 45 of the spindle to press the inner or base end of the sleeve against the wiping ring 18'. Said head 42 of the headed member 41 has a contour complemental to and extending in combination of the outer peripheral contour of the sleeve 23''. A number of facets 46 are formed upon the head 42 to facilitate the engagement therewith of means for rotating the member 41 to either tighten or loosen the same in the threaded recess 45 of the spindle.

A further embodiment of the invention is illustrated in Figure 9. The embodiment herein illustrated has certain parts corresponding to those in Figure 1 embodiment, wherefore these common parts are designated by the same respective reference characters with the addition of the letter "a".

The spindle 17a formed integrally with the gear 13a extends completely through the journaled member 12a which has separate axially spaced bearing members 61 and 62 therein. A cylindrical bar or journal portion 63 of the spindle 17a is journaled in these bearings 61 and 62. Between the journal portion 63 of the spindle and the outer end 64 thereof, there is formed an axially tapered sleeve or cap-receiving portion 65. A section 66 of the spindle between the portions 63 and 65 supports a moisture and dust guard ring 67. Serrations 70 on the section 66 are forced into the inner periphery of the guard hub to positively rotate the guard with the spindle.

The barbed sleeve or cap 23a is formed from a solid piece of round bar stock. It is tapered on its outer periphery and is made hollow by boring operations that can be performed by an automatic screw machine. A tapered portion 68 of the bore 69 enters the cap 23a from its enlarged diameter base or root and is shaped with a pitch corresponding to the pitch of the tapered outer end portion of the spindle so that the inner periphery of the cap will seat uniformly over a large contact area with the spindle when these parts are telescopically assembled as illustrated in Figure 9. The counterbore 71 of reduced diameter in the barb bearing cap is threaded at 72 for meshing with the threads 73 upon an end of an anchorage member in the form of a long machine bolt 74. The shank of this bolt is sufficiently long that the head 75 thereof can remain at the driving gear end of the spindle while the threads thereof are turned into the threads 72 for drawing the cap firmly onto the tapered portion 65 of the spindle in the aforesaid seated relation.

While it is contemplated that the machine bolt 74 may be manipulated for its seating the tapered portions of the cap and of the spindle with sufficient force to prevent relative rotation of these parts, we prefer to provide a greater assurance that the cap and spindle are not rotated relatively with the consequent loosening of the threaded connection between the bolt and the cap. Additional means for preventing relative rotation between the spindle and the cap comprises components respectively upon the spindle and cap, the component on the spindle being in the form of an axially extending peripheral section 76 receded radially inwardly from the general circumferential outline of the tapered portion 65. This radially receded portion is illustrated as a keyway slot. The component upon the cap 23 is an inwardly deflected section 77, and in the form illustrated this inwardly deflected section constitutes a key disposed within the slot 76.

Each of the embodiments herein described diminishes the number of operations necessary for changing the worn barbs of a picker spindle unit, since none of them involves a step of removing the spindle from the associated journal member as 12. Each has the further advantage of diminishing the amount of material discarded when the spindle barbs are replaced and also the amount of material upon which machine operations and other work have been performed. The third embodiment has the still further advantage of making it possible to change the spindle barbs without removal of the spindle unit from the machine, since the parts manipulatable for removing and reassembling the picker sleeve are accessible from the outer end of the spindle. A machine equipped with a spindle structure of a type corresponding to the third embodiment herein illustrated would be susceptible of having the barbs changed in the field, since the operations involved are few and simple and do not require the exposure of any lubricated parts.

While we have herein shown and described a limited number of embodiments of the invention, it should be understood that the invention extends to other embodiments, forms, modifications, structure, and details falling within the scope and spirit thereof and not sacrificing all its material advantages.

What is claimed is:

1. A picker spindle structure comprising a spindle having axially spaced journal and sleeve-holding portions and an axially extending keyway slot, the sleeve-holding portion being tapered, a picker sleeve disposed on and about said sleeve-holding portion and tapered internally to conform to such tapered sleeve-holding portion, and a key comprising a portion of said sleeve projected inwardly into said slot.

2. A picker spindle structure comprising a spindle having opposite ends and axially spaced journal and sleeve-holding portions of which the latter is tapered away from the journal portion toward an end of the spindle and contains an axially extending keyway slot, an axially tapered shell-like picker sleeve of which both the inner and outer peripheries have a taper pitch generally corresponding to that of the spindle tapered portion so the sleeve is assemblable on the spindle with said inner tapered periphery on the periphery of the spindle tapered portion, a key comprising an inwardly projected portion of the sleeve for occupying said slot while the sleeve is assembled on the spindle, and means for detachably maintaining the sleeve in its assembled relation on the spindle.

3. A picker spindle structure comprising a spindle having a journal portion, an exterior sleeve or cap-holding portion disposed between said journal portion and an end of such spindle, and an axial bore communicating outwardly through said spindle end, said holding portion tapering toward said spindle end and containing a keyway slot, a hollow axially tapered barb-bearing cap open at its base end adjacently to which the inner periphery has a taper pitch adapting seating thereof on said cap holding portion of the spindle when the cap and spindle are telescopically assembled, a key comprising an inwardly projected portion of the cap for occupying said slot during such assembly of the cap and spindle, and an anchorage member having portions disposed within said cap and said spindle bore for releasably connecting the same to prevent accidental separation thereof from such assembly.

4. A picker spindle structure comprising an axially bored spindle having a journal portion, an exterior sleeve or cap-holding portion disposed between said journal portion and an end of such spindle, said sleeve-holding portion tapering toward said spindle end and containing an axially extending peripheral section receded radially from the general circumferential outline of said portion, a hollow axially tapered barb-bearing cap open at its base end adjacently to which the inner periphery has a taper pitch adapting seating thereof on said cap-holding portion of the spindle when the cap and spindle are telescopically assembled, said cap having an inwardly deflected section stationed in registry with the spindle receded section during such assembly and cooperable therewith to prevent relative rotation of the spindle and cap, and an anchorage member projected through the bore of the spindle from the opposite end thereof into the hollow cap for detachable connection therewith to prevent accidental endwise separation of the spindle and cap from their said assembly.

5. A picker spindle structure comprising an axially bored spindle having a journal portion and an exterior sleeve or cap-holding portion disposed between said journal portion and an end of such spindle, said sleeve-holding portion tapering toward said spindle end, a hollow axially tapered barb-bearing cap open at its base end adjacently to which the inner periphery has a taper pitch adapting seating thereof on said cap-holding portion of the spindle when the cap and spindle are telescopically assembled, means comprising components respectively on said tapered spindle portion and said tapered inner periphery to resist relative rotation of the cap and spindle thus assembled, and an anchorage member projected through the bore of the spindle from the opposite end thereof into the hollow cap for detachable connection therewith to prevent accidental endwise separation of the spindle and cap from their said assembly.

6. A picker spindle structure comprising a spindle having a journal portion and a sleeve-holding portion between the journal portion and an end of said spindle, a picker sleeve of desired exterior contour assembled coaxially onto the spindle over said end thereof and maintained in such coaxial assembly and reinforced in maintaining such contour by radial reaction upon said sleeve-holding portion, said sleeve being sufficiently long to project an outer end thereof endwise beyond said spindle end while thus assembled with the spindle, and means projecting endwise through such outer end of the sleeve toward and into detachable engagement with said end of the spindle for releasably retaining said sleeve in non-rotative relation with respect to and upon said spindle.

7. A picker spindle structure comprising a spindle having a journal portion and a sleeve-holding portion between the journal portion and an end of said spindle, a tapered picker sleeve open at both ends and placed coaxially of and about the sleeve-holding portion with the larger diameter end of such tapered sleeve nearest to the spindle journal portion, said sleeve-holding portion serving to react radially in opposition to lateral displacement of the sleeve to maintain the coaxial relation thereof, and a fastening member at the smaller diameter end of the sleeve, said fastening member having a head that is axially tapered to supplement the tapered contour of the sleeve and having a shank projecting inwardly through the opening in such smaller diameter end of the sleeve into an anchored relation with the spindle.

8. A picker spindle structure comprising a journal portion and a sleeve-holding portion between the journal portion and an end of the spindle, a tapered picker sleeve open at both ends and placed coaxially of and about said sleeve-holding portion with the larger diameter end of such sleeve nearest to the spindle journal portion, the smaller diameter end of the sleeve projecting axially from and beyond said spindle end while said sleeve-holding portion of the spindle reacts radially upon the sleeve to maintain the coaxial relation of the latter therewith, and a headed fastening member having a shank extending inwardly through the opening in the smaller diameter end of the sleeve into detachable anchorage with the spindle and of which the head is tapered to supplement the tapered contour of the sleeve.

9. For use in a cotton picker spindle structure including a rotatable spindle having a sleeve-supporting portion tapering toward an end thereof, and a headed sleeve attaching member detachably securable in said end of the spindle while projecting endwise therefrom to retain a sleeve thereon; a tapered truncated picker sleeve open at both ends, said sleeve being projectable, base end foremost, onto said spindle over said end thereof, the inner periphery of the projected sleeve being of dimensions to fit onto the tapered sleeve-supporting spindle portion for reinforcing support thereby, the opening in the smaller diameter end of said sleeve being adapted to receive said headed member to accommodate its securement in the spindle for retaining the sleeve on said spindle.

10. For use in a cotton picker spindle structure including a rotatable spindle having a sleeve-supporting portion tapering toward an end thereof, and possessing a surface irregularity, and a headed sleeve holding member detachably securable in said end of the spindle while projecting endwise therefrom to retain a sleeve thereon; a tapered truncated picker sleeve open at both ends and having a side wall irregularity conforming to that in the spindle tapered portion, said sleeve being projectable, base end foremost, onto the spindle over said end thereof, the inner periphery of the projected sleeve being of dimensions to fit onto the tapered sleeve-supporting spindle portion to receive reinforcement in lateral support therefrom while the irregularities in the tapered spindle surface and in the wall of said sleeve mesh to preclude rotation of the sleeve on the spindle, the opening in the smaller diameter end of said sleeve being adapted to receive said headed member to accommodate its securement in the spindle for retaining the sleeve on said spindle.

11. A cotton picker spindle structure comprising a spindle having a journal portion and a sleeve-holding portion, a picker sleeve having a hollow open-ended root portion and a hollow conical barb-bearing portion projecting endwise from such root portion, said sleeve being adapted for coaxial assembly with the spindle sleeve-holding portion by telescoping the open-ended root portion thereonto, and sleeve-supporting means carried by said spindle interiorly of the assembled sleeve to provide lateral support therefor and maintenance of the coaxial relation of the sleeve and spindle, and the hollow barb-bearing sleeve portion being of a length to project a substantial distance endwise from both the spindle and said sleeve-supporting means.

12. A picker spindle structure comprising a spindle having a journal portion, an exterior sleeve or cap-holding portion disposed between said journal portion and an end of such spindle, and an axial bore communicating outwardly through said spindle end, said holding portion tapering toward said spindle end and containing an axially extending peripheral section receded radially from the general circumferential outline of such cap-holding portion, a hollow axially tapered barb-bearing cap open at its base end adjacently to which the inner periphery has a taper pitch adapting seating thereof on said cap-holding portion of the spindle when the cap and spindle are telescopically assembled, said cap having an inwardly deflected section stationed in registry with the spindle receded section during such assembly and cooperable therewith to prevent relative rotation of the spindle and cap, and an anchorage member having portions disposed within said cap and said spindle bore for releasably connecting the same to prevent accidental separation thereof from such assembly.

13. A picker spindle structure comprising an axially bored spindle having a journal portion and an exterior sleeve or cap-holding portion disposed between said journal portion and an end of such spindle, said sleeve-holding portion tapering toward said spindle end, a hollow axially tapered barb-bearing cap open at its base end adjacently to which the inner periphery has a taper pitch adapting seating thereof on said cap-holding portion of the spindle when the cap and spindle are telescopically assembled, means comprising components respectively on said tapered spindle portion and said tapered inner periphery to resist relative rotation of the cap and spindle thus assembled, and an anchorage member disposed within said cap and said spindle bore and connected between said spindle and cap for releasably retaining them telescopically assembled.

DAVID B. BAKER.
CLARENCE R. HAGEN.

REFERENCES CITED

The following references are of record in the file of this patent:

UNITED STATES PATENTS

| Number | Name | Date |
|---|---|---|
| 293,484 | Mason | Feb. 12, 1884 |
| 902,227 | Gray | Oct. 27, 1908 |
| 1,059,478 | Lispenard | Apr. 22, 1913 |
| 2,440,767 | Baker | May 4, 1948 |